United States Patent Office 3,553,180
Patented Jan. 5, 1971

3,553,180
POLYMERS OF VINYLPYRIDINES AND POLY-
VINYL AROMATIC COMPOUNDS
James W. Cleary, Bartlesville, Okla., assignor to Phillips
Petroleum Company, a corporation of Delaware
No Drawing. Filed Nov. 1, 1968, Ser. No. 772,861
Int. Cl. C08f 1/08
U.S. Cl. 260—80.72    8 Claims

ABSTRACT OF THE DISCLOSURE

Vinylpyridines are polymerized in the presence of a polyvinyl aromatic compound. The polymerization is carried out in a reaction medium comprising methanol and water. The resulting polymer is particularly useful as a catalyst support.

---

It is known in the art that vinylpyridines can be polymerized to produce polymeric materials. In accordance with this invention, improved polymers are made by incorporating into the polymerization reaction zone relatively small amounts of polyvinyl aromatic compounds and carrying out the polymerization in the presence of a reaction medium comprising methanol and water. The polymers produced in this manner can be recovered in the form of fine beads which are particularly useful as supports or bases for catalysts.

Accordingly, it is an object of this invention to provide improved processes for polymerizing vinylpyridines.

Another object is to provide novel polymers formed of vinylpyridines and polyvinyl aromatic compounds.

Other objects, advantages and features of the invention should become apparent from the following detailed description.

The vinylpyridines which are polymerized in accordance with this invention have the formula:

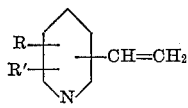

wherein R and R' are hydrogen or alkyl groups having 1 to 4 carbon atoms. Examples of such vinylpyridines which can be polymerized in accordance with this invention include 2-vinylpyridine, 3-vinylpyridine, 4-vinylpyridine, 2-methyl-5-vinylpyridine, 4-butyl-2-vinylpyridine, 3,5-dimethyl-2-vinylpyridine, and the like. One or more of these pyridines can be employed in forming the polymers of this invention.

The second material employed in forming the polymers of this invention is a polyvinyl aromatic compound. This material is employed in an amount ranging from 1 to 15 parts by weight per 100 parts of vinylpyridine. The polyvinyl aromatic compounds so employed can have any one of the following general formulas:

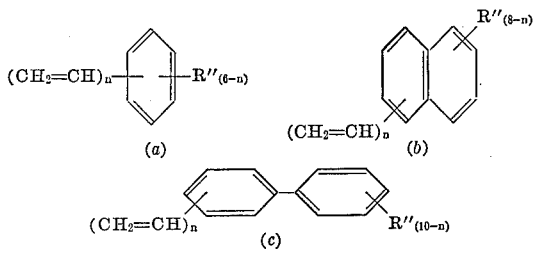

wherein each R'' is hydrogen or an alkyl group containing 1 to 4 carbon atoms with the total of the alkyl substituents containing not more than 12 carbon atoms, and $n$ is 2 or 3. The substituents in the above Formulas b and c can be on either or both rings. Examples of suitable polyvinyl aromatic compounds which can be employed include divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl - 3,7 - diethylnaphthalene, 1,3-divinyl-4,5,8-tributylnaphthalene, 2,2'-divinyl-4-ethyl-4'-propylbiphenyl, and the like. The divinyl aromatic hydrocarbons containing up to 26 carbon atoms are preferred, particularly divinylbenzene in either its ortho, meta, or para isomer. Commercial divinylbenzene which is a mixture of isomers is quite satisfactory. One or more of the polyvinyl aromatic compounds can be employed, providing that the total amount of compounds so employed is within the range described.

The vinylpyridines and the polyvinyl aromatic compounds are introduced into a suitable reactor along with a polymerization catalyst. Various catalysts known in the art for the polymerization of vinylpyridines can be employed in the process of this invention. Suitable catalysts for this purpose include peroxy compounds, perchlorates, persulfates, diazo thio ether compounds, azo-bis-alkylnitrile compounds, and the like. Examples of specific catalysts which can be used include hydrogen peroxide, ditert-butyl peroxide, benzoyl peroxide, perchloric acid, persulfuric acid, cumene hydroperoxide, (dimethylbenzenediazo - mercapto)naphthalene, azo - bis - isobutyronitrile (AIBN), and the like. Other catalysts which can be employed include free radical precursors which are listed in the Faraday Society Symposium on Free Radicals, London, 1953 and the book Free Radicals by Ingram, Academic Press, Inc., New York, 1958. The amount of catalyst used is generally in the range of 0.01 to 2 parts by weight per 100 parts of total vinylpyridine.

The polymerization reactions of this invention are carried out in the presence of a reaction medium which comprises a mixture of methanol and water. This mixture should contain from 35 to 60 volume percent methanol. When this specific reaction medium is utilized, the resulting polymer is in the form of a fluffy white solid. This solid can be water-washed to recover a white, free-flowing powder comprising small beads of polymer. These polymer beads are particularly useful as a support for forming catalysts.

The polymerization reaction can take place under a variety of reaction conditions. For example, reaction temperatures in the general range of 25 to 150° C. are suitable. Reaction pressure of 0 to 100 p.s.i.g., or higher, can be employed. Reaction times are usually in the range of 15 minutes to 150 hours. It is generally desirable to carry out the polymerization reaction in an inert atmosphere. This can be accomplished by purging the reactor with an inert gas such as nitrogen, and maintaining a blanket of such a gas within the reactor during the polymerization. The reaction effluent can be water washed to remove traces of catalyst and recover polymer in powder form.

The resulting polymer can be used in a variety of ways. It can be used in forming ion exchange resins or as a molding material. One particularly useful application is in forming catalysts to carry out hydroformylation reactions of the type described in U.S. Pat. 3,231,621. In this application, the polymer is impregnated with a catalytic material such as dicobalt octacarbonyl to form a catalyst system for the hydroformylation reaction.

A number of runs were made to demonstrate the polymerization process of this invention. In these runs, the reactants were charged to a reaction vessel in the following order: catalyst, methanol, vinylpyridine, polyvinyl aromatic compound and water. The reaction vessel was then evacuated and thereafter flushed with nitrogen. The reactions were carried out under a blanket of nitrogen under a pressure of 5 to 10 p.s.i.g. The resulting polymers of this invention which appeared as fluffy white solids were washed with water to produce free-flowing powder. The following runs were made:

| Run No. | Vinyl pyridine used | Grams | DVB[1] | AIBN[2] | M1 CH₃OH | M1 H₂O | Temp., °C. | Time, hr. | CH₃OH vol. percent |
|---|---|---|---|---|---|---|---|---|---|
| 1 | 2-VP | 24.5 | 0.5 | 0.05 | 75 | 50 | 50 | 116 | 60 |
| 2 | 2-VP | 24.0 | 1.0 | 0.05 | 75 | 50 | 50 | 116 | 60 |
| 3 | 2-VP | 23.5 | 1.5 | 0.05 | 75 | 50 | 50 | 116 | 60 |
| 4 | 2-VP | 23.0 | 2.0 | 0.05 | 75 | 50 | 50 | 116 | 60 |
| 5 | 2-VP | 78.5 | 8.75 | 0.175 | 262 | 175 | 70 | 92 | 60 |
| 6 | 2-VP | 96.0 | 4.0 | 0.2 | 300 | 200 | 70 | 64 | 60 |
| 7 | 2-VP | 69.0 | 2.87 | 0.144 | 216 | 144 | 70 | 64 | 60 |
| 8 | 2-VP | 96.0 | 4.0 | 0.2 | 300 | 200 | 50 | 96 | 60 |
| 9 | 2-VP | 24.0 | 1.0 | 0.05 | 50 | 75 | 70 | 52 | 40 |
| 10 | 2-VP | 24.0 | 1.0 | 0.05 | 62.5 | 62.5 | 70 | 52 | 50 |
| 11 | 3-VP | 48.0 | 2.0 | 0.1 | 150 | 100 | 70 | 44 | 60 |
| 12 | 4-VP | 96.0 | 4.0 | 0.2 | 300 | 200 | 70 | 64 | 60 |
| 13 | 4-VP | 40.2 | 1.67 | 0.084 | 126 | 84 | 70 | 64 | 60 |
| 14 | 2-VP | 24.0 | 1.0 | 0.05 | 37.5 | 87.5 | 70 | 52 | 30 |
| 15 | 2-VP | 24.0 | 1.0 | 0.05 | 87.5 | 37.5 | 70 | 52 | 70 |
| 16 | 2-VP | 24.0 | 1.0 | 0.05 | 100 | 25 | 70 | 52 | 80 |
| 17 | 2-VP | 24.0 | 1.0 | 0.05 | 112.5 | 12.5 | 70 | 52 | 90 |
| 18 | 2-VP | 24.0 | 1.0 | 0.05 | 125 | 0 | 70 | 52 | 100 |
| 19 | 2-VP | 25.0 | 0.0 | 0.05 | 126 | 50 | 70 | 52 | 60 |
| 20 | 2-VP | 20.0 | 0.0 | 0.04 | 50 | 50 | 70 | 66 | 50 |
| 21 | 2-VP | 20.0 | 0.0 | 0.04 | 40 | 60 | 70 | 66 | 40 |
| 22 | 2-VP | 18.8 | 0.0 | 0.04 | 50 | 50 | 70 | 66 | 50 |

[1] Divinylbenzene, expressed in grams. The material used was a commercial grade of divinylbenzene containing about 52 weight percent divinylbenzene, with the remainder being ethylstyrene and diethylbenzene. The amounts in the table are actual divinylbenzene.

[2] Azo-bis-isobutyronitrile, expressed in grams.

Runs 1 to 13 demonstrate this invention. In all of these runs a fluffy white solid was present in the reaction mixture. The polymer yield, based on vinylpyridine plus divinylbenzene was greater than 85% in all runs. In Run 14, the reaction mixture contained two phases, one of which was a jelly. The reaction products of Runs 15–18 were of the form of a clear jelly. The reaction product was a solution in Run 19, which contained no divinylbenzene. In Runs 20 to 22, which contained no divinylbenzene, the reaction mixture formed two layers, the top being a white fluid and the bottom being a viscous yellow fluid. Run 22 contained 2.1 grams of styrene in place of divinylbenzene.

The foregoing runs clearly demonstrate that a desired white fluffy polymer is obtained when divinylbenzene is employed and the methanol concentration in the methanol-water reaction medium is greater than 30 and less than 70 volume percent.

While this invention has been described in conjunction with presently preferred embodiments, it should be evident that it is not limited thereto.

What is claimed is:

1. The process which comprises polymerizing at least one vinylpyridine of the formula

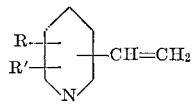

wherein each R and R' is hydrogen or an alkyl group having 1 to 4 carbon atoms; such polymerization being conducted in the presence of (1) from about 1 to 15 parts by weight per 100 parts of vinylpyridine of at least one polyvinyl aromatic compound of the formula

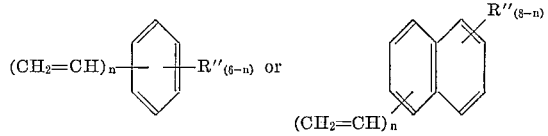

or

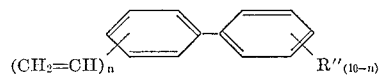

wherein each R" is hydrogen or an alkyl group having 1 to 4 carbon atoms, with the total of the alkyl constituents containing not more than 12 carbon atoms, and $n$ is 2 or 3, and (2) a reaction medium comprising methanol and water wherein the methanol comprises 35 to 60 volume percent of said reaction medium.

2. The process of claim 1 wherein said polyvinyl aromatic compound is divinylbenzene.

3. The process of claim 1 wherein the product obtained from the polymerization is washed with water.

4. The process of claim 1 wherein the polymerization is carried out in the presence of azo-bis-isobutyronitrile.

5. The process of claim 1 wherein said vinylpyridine comprises 2-vinylpyridine and said polyvinyl aromatic compound comprises divinylbenzene.

6. The process of claim 1 wherein said vinylpyridine comprises 3-vinylpyridine and said polyvinyl aromatic compound comprises divinylbenzene.

7. The process of claim 1 wherein said vinylpyridine comprises 4-vinylpyridine and said polyvinyl aromatic compound comprises divinylbenzene.

8. The process of claim 1 wherein the polymerization is carried out in the temperature range of 25 to 150° C. and in the pressure range of 0 to 100 p.s.i.g.

References Cited

UNITED STATES PATENTS 2,540,984  2/1951  Jackson _____ 260—88.1
2,828,270  3/1958  Murata _____ 260—2.1

JOSEPH L. SCHOFER, Primary Examiner

S. M. LEVIN, Assistant Examiner

U.S. Cl. X.R.

260—2.1, 29.6, 88.1